(12) United States Patent
Sodeoka et al.

(10) Patent No.: US 7,246,945 B2
(45) Date of Patent: Jul. 24, 2007

(54) OIL DYNAMIC BEARING, MOTOR SUPPORTED ON OIL DYNAMIC BEARING AND DISK DRIVE CARRYING THE MOTOR

(75) Inventors: Satoru Sodeoka, Kyoto (JP); Hideki Nishimura, Kyoto (JP); Takayuki Oe, Kyoto (JP)

(73) Assignee: Nidec Corporation, Kyoto (JP)

( * ) Notice: Subject to any disclaimer, the term of this patent is extended or adjusted under 35 U.S.C. 154(b) by 139 days.

(21) Appl. No.: 11/160,922

(22) Filed: Jul. 15, 2005

(65) Prior Publication Data
US 2006/0018573 A1   Jan. 26, 2006

(30) Foreign Application Priority Data
Jul. 26, 2004   (JP) ............................ 2004-217627

(51) Int. Cl.
*F16C 32/06* (2006.01)
(52) U.S. Cl. .................. 384/110; 384/107; 384/112
(58) Field of Classification Search ................ 384/110, 384/107, 112, 119, 124
See application file for complete search history.

(56) References Cited

U.S. PATENT DOCUMENTS 6,066,903 A    5/2000  Ichiyama
2003/0223660 A1  12/2003  Grantz et al.

FOREIGN PATENT DOCUMENTS

| JP | 2002-122134 A | 4/2002 |
| JP | 2003-009462 A | 1/2003 |
| JP | 3462982 B2 | 8/2003 |
| JP | 2003-314535 A | 11/2003 |

*Primary Examiner*—Lenard A. Footland
(74) *Attorney, Agent, or Firm*—James & Murakami IP

(57) ABSTRACT

An oil dynamic bearing, a motor and a disk drive adapted to be reduced in both size and thickness are disclosed. The oil dynamic bearing (B) includes at least two bearing portions (B1, B2), each having a bearing near end nearer to the rotational axis or the bearing center of the bearing and a bearing far end farther from the rotational axis or the bearing center of the bearing. The near and bearing far ends are each connected to a taper seal portion, which in turn communicates with the atmosphere. The taper seal portion connected to the bearing near end of the bearing portion (B1) and the taper seal portion connected to the bearing near end of the other bearing portion (B2) make up a common taper seal portion.

20 Claims, 10 Drawing Sheets

OIL DYNAMIC BEARING, MOTOR SUPPORTED ON OIL DYNAMIC BEARING AND DISK DRIVE CARRYING THE MOTOR

BACKGROUND OF THE INVENTION

1. Field of the Invention

This invention relates to an oil dynamic bearing using an oil or the like as a lubrication fluid and a motor and a disk drive having the oil dynamic bearing.

2. Description of the Related Art

In recent years, the hard disk drive (HDD) has been increased in capacity and improved in quietude. The hard disk drives having a spindle motor for driving the disk supported on an oil dynamic bearing has found an increased application.

In the oil dynamic bearing, the oil held in a minuscule gap between the surface of a rotary unit and the surface of a fixed unit is caused to develop the dynamic pressure through a plurality of dynamic pressure generating grooves formed on at least one of the surfaces of the rotary unit and the fixed unit in the gap, and the rotary unit is supported rotatably by the dynamic pressure of the oil.

A motor having a dynamic bearing using an oil is known, comprising upper and lower radial bearings for supporting the radial load of the rotary unit, upper and lower thrust bearings for supporting the axial load of the rotary unit and a taper seal structure formed at the ends of the radial bearing portion and the thrust bearing portion not to scatter the oil.

This structure has the feature that an oil interface with an air is formed at the ends of each bearing portion and therefore bubbles, if generated in the oil, are easily discharged out and therefore a malfunction due to the bubbles hardly occurs.

Some examples of the malfunction due to the bubbles in the dynamic bearing include a case in which bubbles, if mixed in the minuscule gap of the dynamic bearing which should be filled up with the oil, are thermally expanded at high temperatures. As a result, the oil forcibly leaks out, the bearing surfaces facing the bubbles come into contact with each other and burn, or the uneven magnitude of the dynamic pressure of the bubbles causes instability.

The storage capacity of the HDD has so increased and the price thereof has so decreased recently that the HDD has now come to find application in various home electric appliances such as the recording equipment, the portable music player and the digital camera as well as the storage device of the personal computer.

The home electric appliances are required to be reduced in size and used in various environments. The HDD mounted in the home electric appliances, therefore, requires new characteristics not required of the personal computer. The HDD mounted on the portable devices such as the portable music player and the digital camera, for example, is required to be compact and thin, high in shock resistance and vibration resistance and have an internal power supply small in power consumption to stand the protracted use without adversely affecting the storage capacity and quietude.

In order to realize such HDD, a spindle motor for driving the disk in keeping with the characteristics described above is required, and we have studied the use of an oil dynamic bearing having an oil interface with an air at each end of the bearing as explained above.

Generally, the spindle motor carrying an oil dynamic bearing can be implemented with high-accuracy rotation, and therefore the HDD having this motor can achieve the desired storage capacity and quietude. The oil dynamic bearing having an oil interface with an air at the ends thereof, however, requires a space for holding the oil in a taper seal portion and a bearing portion, and therefore cannot be suitably reduced in size or thickness.

For this reason, the spindle motor and the HDD carrying this oil dynamic bearing is difficult to reduce in size and thickness.

The foregoing is the description of the HDD, the spindle motor and the oil dynamic bearing mounted on the HDD. A similar problem is encountered, however, also in the use of the oil dynamic bearing for motors of other applications and the devices carrying the motors.

BRIEF SUMMARY OF THE INVENTION

The object of this invention is to provide an oil dynamic bearing, a motor and a disk drive which can be reduced in size or thickness.

An oil dynamic bearing having a bearing center according to the invention includes two bearing portions having the near end and the far end of each bearing portion, and three taper seal portions, called as first, second and third tape seal portions. The near end is defined as one end of the bearing portion nearer to selected one of the rotational axis and the bearing center of the oil dynamic bearing. The far end is defined as another end of the bearing portion rather than the near end. Each taper seal portion has inner end (narrow end) and outer end (wide end), and the dimension of a taper seal gap gradually increases with the distance from the minuscule gaps at the narrow end to that of the gap of the wide end. The near ends of these bearing portions are connected commonly to the narrow end of the third taper seal portion. Each of the far ends of the bearing portions are connected to the narrow ends of the first and the second taper seal portions. Every wide end of the taper seal portions is communicating with an atmosphere. This configuration of the present invented oil dynamic bearing can reduce the number of taper seal portions without adversely affecting the performance to discharge bubbles from the oil and simplifies the bearing structure, thereby making it possible to reduce both the size and thickness thereof. Also, this structure to facilitate the discharge of bubbles from the bearing makes easy the job of filling the oil at the time of assembly. Further, the simplified bearing structure reduces the parts processing cost, thereby reducing the production cost. More preferably, the third taper seal portions at the near ends of the bearing portions are arranged in parallel with the two bearing portions in axial or radial direction. Then, the size and thickness can be further reduced.

According to one preferred aspect of the invention, there is provided an oil dynamic bearing, in which an oil interface with an air is formed in the taper seal portion connected to the far end of the bearing thereby to make oil leakage difficult.

According to another preferred aspect of the invention, there is provided a dynamic bearing having a plurality of dynamic pressure generating grooves in the shape of an unbalanced herring bone for pushing the oil to the far end of the bearing. Then, the portion associated with the maximum oil dynamic pressure is located farther from the rotational axis or the bearing center of the bearing, which makes the bearing span wider. Thus, the rotary unit (rotary assembly) is held in stable posture for an improved shock resistance and vibration resistance.

According to still another preferred aspect of the invention, there is provided an oil dynamic bearing, in which the oil interface with the air is formed in the third taper seal portion when the motor is stationary, while when the motor is in rotation, the oil interface is divided into and formed at two divided oil interfaces at a vicinity of each of the near ends of the bearing portions. Then, the bubbles generated in the oil are more easily discharged during the motor rotation, thereby reducing the chance of the malfunction which otherwise might be caused by the bubbles. More preferably, at least one of the two oil interfaces with the air thus divided is formed in the area formed with the dynamic pressure generating grooves. Then, the bearing loss of the bearing portions is reduced, and therefore the power consumption of the motor carrying the oil dynamic bearing is also reduced.

According to yet another aspect of the invention, there is provided a motor comprising the oil dynamic bearing, a magnet formed integrally with the rotary unit, and a stator formed integrally with a fixed unit. Since the oil dynamic bearing is small in size, thickness and cost, the motor can also be reduced in size, thickness and cost. Preferably, the fixed unit includes a solid cylindrical shaft located on the rotational axis, and has such a configuration that the ends of the shaft are exposed out of the motor. Then, this portion can be used to mount the motor on the housing of an equipment carrying the motor. Thus, even a small, thin motor can be easily mounted.

According to a further aspect of the invention, there is provided a disk drive for recording information, wherein any one of the motors described above is used as a spindle motor for rotationally driving the information recording disk and can be reduced in size and thickness. Especially, a disk drive having the disk diameter of not more than one inch is preferable. Also, the disk drive can share the other operational advantages of the motors.

DETAILED DESCRIPTION OF THE INVENTION

Figure 1:
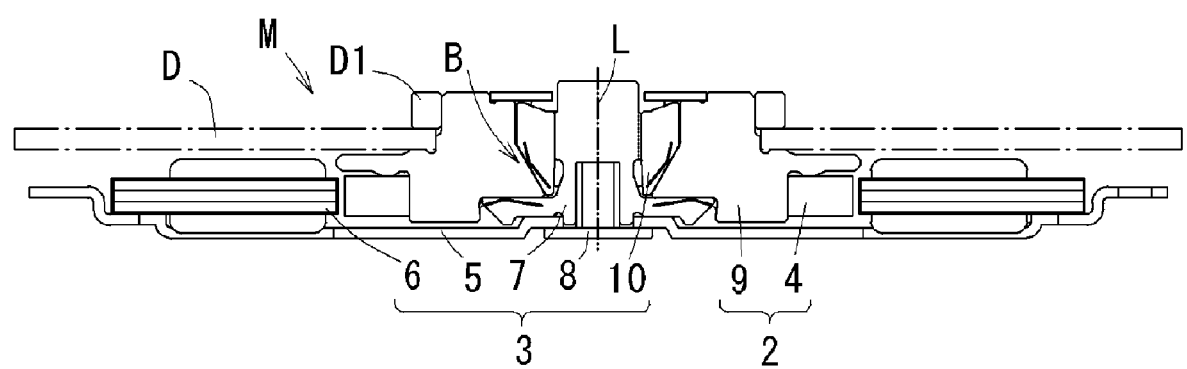
FIG. 1 is a sectional view showing an oil dynamic bearing and a motor according to a first embodiment of the invention.
Figure 2:
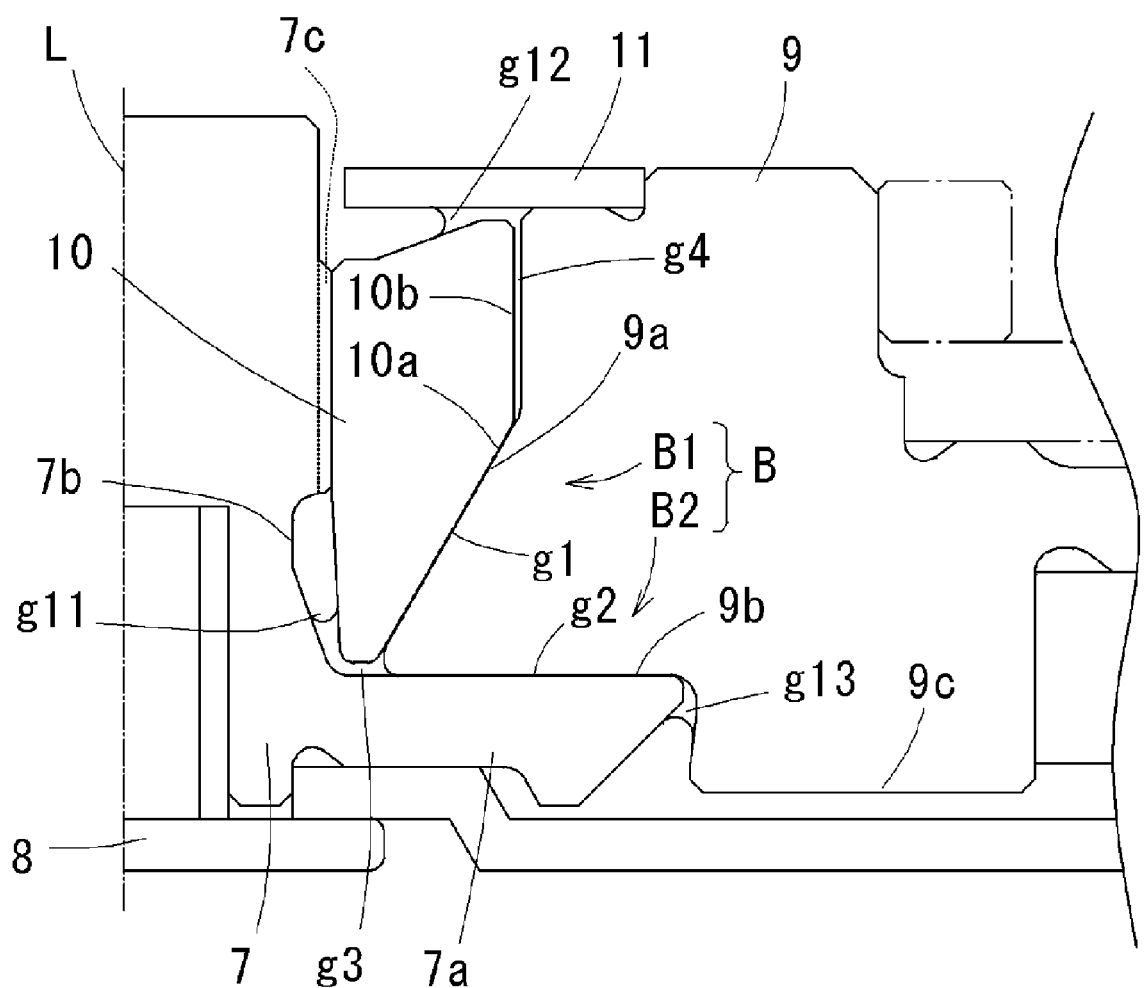
FIG. 2 is a sectional view of the essential parts built around the oil dynamic bearing of FIG. 1.
Figure 3A:
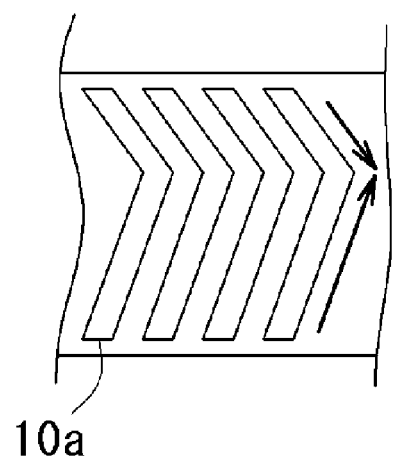
FIGS. 3A and 3B are development plan views schematically showing the dynamic pressure generating grooves of the oil dynamic bearing shown in FIG. 1.
Figure 3B:
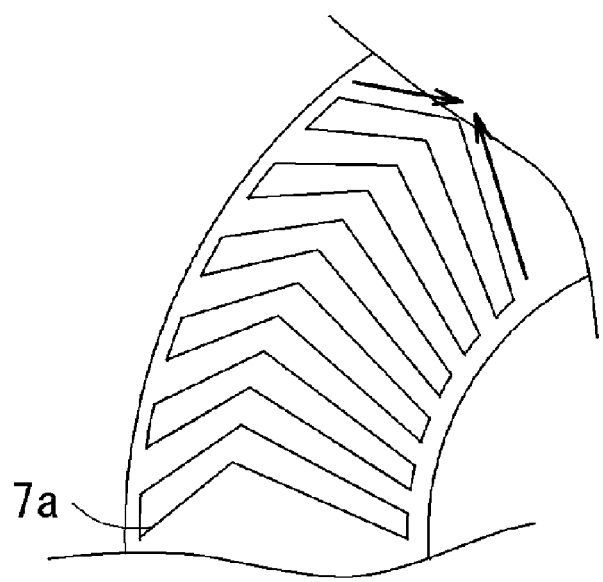
Figure 4A:
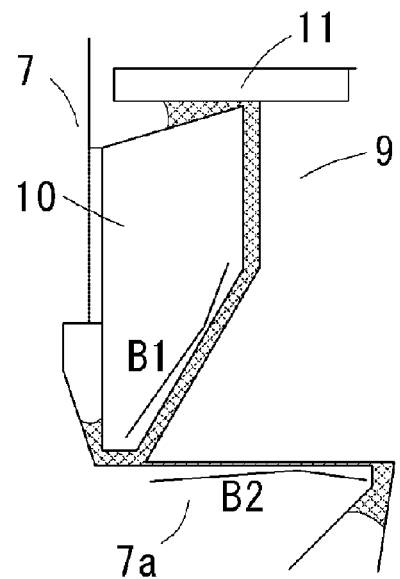
FIG. 4A is a sectional view showing a configuration of the oil dynamic bearing of FIG. 1 when the motor is stationary, and FIG. 4B a sectional view showing a configuration of the oil dynamic bearing of FIG. 1 when the motor is in rotation.
Figure 4B:
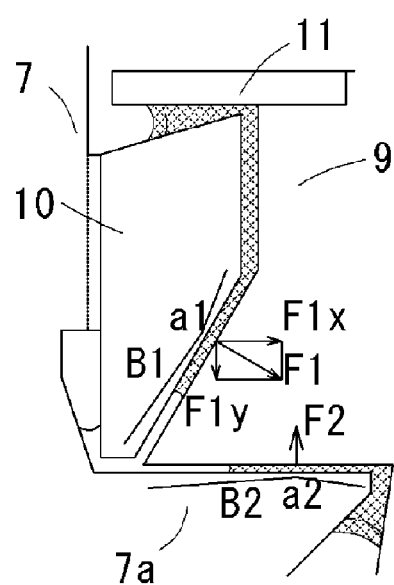
Figure 5:
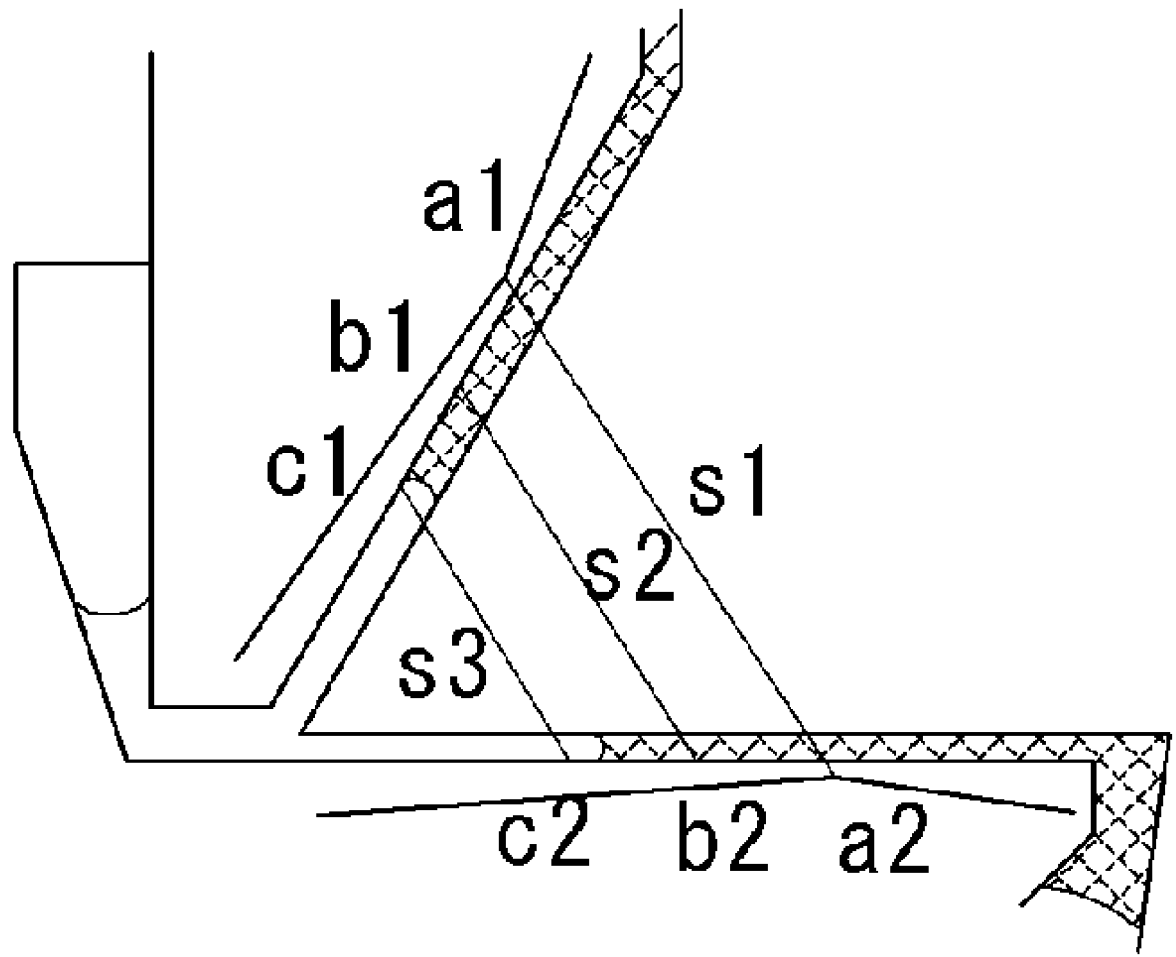
FIG. 5 is another sectional view showing a configuration of the oil dynamic bearing corresponding to FIG. 4B when the motor is in rotation.

The best mode for carrying out the invention is explained below with reference to the drawings taking the HDD carrying a motor having a dynamic bearing as a disk-driving spindle motor as an example. FIG. 1 is a sectional view showing a motor according to a first embodiment of the invention, FIG. 2 is a sectional view of the essential parts built around the oil dynamic bearing of FIG. 1. FIGS. 3A and 3B are development plan views schematically showing dynamic pressure generating grooves of the oil dynamic bearing shown in FIG. 1. FIGS. 4A, 4B and 5 are sectional views schematically showing the operation of the essential parts of the dynamic bearing of FIG. 1. In the description that follows, the direction in which the rotary axis of the motor extends is defined as an axial direction, and the direction orthogonal to the rotary axis as a radial direction.

EMBODIMENT 1

A motor M according to this embodiment, as shown in FIG. 1, is an axially fixed motor for driving a disk, in which a rotary assembly 2 carrying a disk D for storing the information is supported rotatably by a dynamic bearing B on a fixed assembly 3.

The rotary assembly 2 is configured mainly of a rotor hub 9 and a drive magnet 4, and an annular drive magnet 4 is fixedly fitted under the outer peripheral surface of the rotor hub 9. The rotor hub 9 has a cone-shaped central through hole, in which one of the bearing portions described later is arranged. A flange is formed on the outer periphery of the rotor hub 9, and the drive magnet 4 is arranged under the flange. Above the flange, the disk D fitted on the cylindrical portion of the rotor hub 9 is placed together with a clamp member D1.

The fixed assembly 3 is configured mainly of a shaft 7, a cone member 10, a base plate 5, a stator 6 and a circuit board (not shown). The base plate 5 is in the shape of a thin dish of a magnetic material. The stator 6 is fixed in the outer part of the dish, while an inverted-T shaft 7 is fixed by a screw 8 in the central hole of the dish. The inner peripheral surface of the stator 6 is arranged in opposed relation radially with the outer peripheral surface of the drive magnet 4. In this case, the axial magnetic center of the stator 6 substantially coincides with the axial magnetic center of the drive magnet 4.

The hollow cylindrical cone member 10 having an outer peripheral conical surface 10a is fixedly fitted under pressure on the solid cylindrical portion of the shaft 7. The outer conical surface 10a is arranged with the diameter thereof reduced axially downward. The cone member 10 of the fixed assembly 3 is inserted into the conical through hole of the rotor hub 9 via a minuscule gap holding the oil as described later, and the upper end surface of the thrust 7a of the shaft 7 is opposed to the inner lower end surface 9b of the rotor hub 9 through a minuscule gap holding the oil described later. Once power is supplied to the stator 6, a rotational magnetic field is induced and magnetically reacts with the drive magnet 4 thereby to generate a running torque. This running torque rotates the rotary assembly 2.

The dynamic bearing B is configured of a conical bearing portion B1 subjected to the bearing power diagonally of the axial direction and a thrust bearing portion B2 subjected to the bearing power in axial direction. The two bearing portions B1, B2 are so related to each other that the direction from the bearing near end located near to the rotational axis (corresponding to the one-dot chain indicated by reference character L in FIGS. 1, 2) or the bearing center of the bearing B (the portion located between the conical bearing portion B1 and the thrust bearing portion B2) to the bearing far end located farther from the rotational axis or the bearing center is different between the bearing portions B1 and B2. Specifically, as obvious from FIG. 2, the minuscule gap g1 of the conical bearing portion B1 is formed diagonally of the rotational axis L, while the minuscule gap g2 of the thrust bearing portion B2 is formed at right angles to the rotational axis L.

The inner conical surface 9*a* of the conical bearing portion B1 forming a conical through hole of the rotor hub 9 is opposed to the outer conical surface 10*a* of the cone member 10 through the first minuscule gap g1, and the oil is held by capillarity in the first minuscule gap g1. The portions connected to the ends of the minuscule gap g1 each have a taper seal portion described later. The outer conical surface 10*a*, as shown in FIG. 3A, is covered, over the entire periphery thereof, with dynamic pressure generating grooves in the shape of an unbalanced herring bone to push the oil of the first minuscule gap g1 upward along the axial direction. These dynamic pressure generating grooves in the shape of unbalanced herring bone, as shown in FIG. 3A, are configured of a multiplicity of V-grooves having different length to the ends from the inflection point (longer lower side) and formed equidistantly in peripheral direction (V-like lines in FIGS. 1 and 4 schematically show one of the dynamic pressure generating grooves). With the rotation of the rotary assembly 2, the oil is pushed toward the inflection point from the ends of each dynamic pressure generating groove so that the internal pressure of the gap increases and induces an oil dynamic pressure. As shown in FIG. 3A, the lower side of these dynamic pressure generating grooves is axially longer than the upper side thereof with respect to the inflection point. Therefore, the oil is pushed upward more strongly. In total, therefore, the oil is pushed upward in axial direction. As a result, the bearing power F1 is exerted in the direction perpendicular to the inner conical surface 9*a* (FIG. 4B).

The thrust bearing portion B2 has the upper end surface of the thrust portion 7*a* opposed to the inner lower end surface 9*b* of the rotor hub 9 through the second minuscule gap g2, and the oil is held by capillarity in the second minuscule gap g2. The portions connected to the ends of the minuscule gap g2 each have a taper seal portion described later. The upper end surface of the thrust portion 7*a*, as shown in FIG. 3B, is covered, over the entire periphery thereof, with dynamic pressure generating grooves in the shape of an unbalanced herring bone to push the oil of the second minuscule gap g2 radially outward. These dynamic pressure generating grooves in the shape of unbalanced herring bone, as shown in FIG. 3B, are configured of a multiplicity of V-grooves having different length (longer inner side) to the ends from the inflection point and formed equidistantly in peripheral direction (V-like lines in FIGS. 1 and 4 schematically show one of the dynamic pressure generating grooves). With the rotation of the rotary assembly 2, the oil is pushed toward the inflection point from the ends of each dynamic pressure generating groove so that the internal pressure of the gap increases and induces the oil dynamic pressure. As shown in FIG. 3B, the inner side of these dynamic pressure generating grooves is radially longer than the outer side thereof with respect to the inflection point. Therefore, the oil is pushed outward more strongly. In total, therefore, the oil is pushed outward in radial direction to increase the internal pressure. As a result, the bearing power F2 is exerted in the direction perpendicular to the inner lower end surface 9*b* (FIG. 4B). The operation of the bearing portions B1, B2 is explained in more detail later.

The portion defined by the inner conical surface 9*a* and the inner lower end surface 9*b* of the rotor hub 9 is opposed to the outer conical surface 10*a* of the cone member 10 and the upper end surface of the thrust portion 7*a*, and therefore the rotary assembly 2 cannot substantially be moved in axial direction with respect to the fixed assembly 3. In other words, the bearing portions B1, B2 act as a stopper structure of the rotary assembly 2.

The bearing portions B1 and B2 communicate with each other through a third minuscule gap g3 formed between the lower end surface of the cone member 10 and the upper end surface of the thrust portion 7*a*. This minuscule gap g3 also holds the oil by capillarity continuously with the bearing portions B1, B2. The size of the third minuscule gap g3 is sufficiently larger than those of the first and second minuscule gaps g1, g2.

The near end side of the third minuscule gap g3 communicates with the first taper gap g11 formed in the fitting portion between the shaft 7 and the cone member 10. The first taper gap g11 is defined by a diagonal recess 7*b* with the lower side of the outer peripheral surface of the shaft 7 formed with progressively smaller diameter upward in axial direction and the inner peripheral surface of the cone member 10 opposed to the diagonal recess 7*b*, and communicates with the atmosphere through a communication hole 7*c*. The communication hole 7*c* is defined by a vertical groove formed at the upper end of the diagonal recess 7*b* and the inner peripheral surface of the cone member 10 opposed to the vertical groove. The first taper gap g11 continuously holds the oil by capillarity in the third minuscule gap g3, and a meniscus oil interface with an air is formed with the atmosphere in the first taper gap g11. The first taper gap g11 progressively increases with the distance from the minuscule gaps making up the bearing portions B1, B2. Therefore, the capillarity works to pull back the oil interface with the air toward the bearing portions where the gap is smaller, thereby making up a taper seal portion to prevent the oil from being scattered.

This taper seal portion is formed as a common seal portion connected to the near ends of the bearing portions B1, B2, and therefore a seal is not required for each of the bearing portions B1, B2 for a simplified structure. As a result, the bearing portions B1, B2 can be arranged in more proximity to each other by the degree corresponding to the lack of individual seal portions, and thus the size of the dynamic bearing B and the motor M can be reduced. The size of the dynamic bearing B and the motor M can be further reduced by extending the first taper gap g11 axially upward in such a manner as to be superposed radially over the axial range of the conical bearing portion B1. Further, the first taper gap g11 is formed in the fixed assembly 3, and therefore the oil interface with the air hardly flows during the rotation of the motor for a higher sealing effect. The first taper gap g11 may be extended axially downward in the fitting portion between the thrust portion 7*a* and the shaft 7 configured as separate members, or formed in the portion defined by the inner conical surface 9*a* and the inner lower end surface 9*b* of the rotor hub 9, together with a new communication hole communicating with the particular portion for communication with the atmosphere.

The upper end of the first minuscule gap g1 communicates with a fourth minuscule gap g4, and the upper portion of the fourth minuscule gap g4 communicates with the atmosphere through a second taper gap g12. The fourth minuscule gap g4 continuously holds the oil of the first taper gap g1. The fourth minuscule gap g4 also communicates with the second taper gap g12, which also continuously holds the oil. The fourth minuscule gap g4 is defined by the inner cylindrical surface of the rotor hub 9 and the outer cylindrical surface 10a of the cone member 10, and has a larger size than the first minuscule gap g1. The second taper gap g12, which is defined by the annular cover member 11 fixed on the upper end surface of the rotor hub 9 and the inclined upper end surface of of the cone member 10, has a size progressively increasing radially inward and communicates with the atmosphere through the gap between the cover member 11 and the shaft 7. As a result, the second taper gap g12 forms an internal meniscus oil interface with the atmosphere and makes up a taper seal portion. This taper seal portion has a high sealing effect even during the motor rotation in view of the fact that the centrifugal force of the motor rotation works in such a direction as to push the oil interface toward the bearing portions.

The far end of the second minuscule gap g2 communicates with the third taper gap g13 defined by the outer peripheral surface of the thrust portion 7a and the second inner cylindrical surface of the rotor hub 9, and communicates with the atmosphere through the gap g13. The outer peripheral surface of the thrust portion 7a and the second inner cylindrical surface of the rotor hub 9 both progressively decrease in diameter axially downward, while the third taper gap g13 progressively increases in gap size axially downward. In view of the fact that the inclination angle of the thrust portion 7a is larger than that of the rotor hub 9, the third taper gap g13 is inclined radially inward.

Thus, the oil in the second minuscule gap g2 is held continuously up to the third taper gap g13, and a meniscus oil interface is formed in the second minuscule gap g2 with respect to the atmosphere thereby to make up a taper seal portion. This taper seal portion, due to the inclination of the third taper gap g13, has the oil interface thereof directed radially inward, and the centrifugal force of motor rotation acts to push the oil interface toward the bearing portions, thereby achieving a high sealing effect even during the motor rotation.

As described, the dynamic bearing B holds the oil continuously in the first to fourth minuscule gaps g1 to g4, and is sealed by the taper seal portions connected to the ends of the conical bearing portion B1 and the thrust bearing portion B2. In addition, these taper seal portions on the near end side are formed at a common point.

The foregoing description concerns the configuration of the dynamic bearing B in which the oil dynamic pressure is not induced as the motor M is out of operation. Now, the configuration of the dynamic bearing B with the oil dynamic pressure induced by the steady rotation of the motor M is explained with reference to FIGS. 4B, 5.

With the steady rotation of the motor M, the oil is pushed toward the inflection point from the ends of the dynamic pressure generating grooves of the conical bearing portion B1, as shown in FIG. 3A. Since the lower half of each groove is longer, however, the oil is pushed more strongly by the lower half of the grooves. In total, therefore, the oil is pushed axially upward. In similar fashion, the oil is pushed toward the inflection point from the ends of the dynamic pressure generating grooves of the thrust bearing portion B2 as shown in FIG. 3B. Since the inner half of each dynamic pressure generating groove of the thrust bearing portion B2 is larger, the oil is pushed more strongly by the inner half of the grooves. In total, the oil is pushed radially outward (in the direction away from the center of the dynamic bearing B). Due to these two operations, the oil in the first taper gap g11 and the third minuscule gap g3 is supplied to the bearing portions B1, B2. At the same time, the oil interface with the air is moved, and the oil thus far connected to each other in the bearing portions B1, B2 are disconnected, and two oil interfaces with the air are formed. These two oil interfaces with the air, as shown in FIG. 4B, are formed both in the same area as the dynamic pressure generating grooves of the bearing portions B1, B2 are formed.

The oil in the second taper gap g12, on the other hand, is subjected to such a force as to be pushed toward the bearing portion B1 (axially downward) by the centrifugal force of rotation, in addition to the capillarity acting on the oil. The axially downward pushing force is balanced with the axially upward pushing force of the dynamic pressure generating grooves thereby to increase the internal oil pressure of the first, fourth minuscule gaps g1, g4 and the second taper gap g12. The oil in the third taper gap g13 is also subjected to the pushing force toward the bearing portion B2 (radially inward) by the centrifugal force of rotation, in addition to the capillarity acting on the oil. This radially inward pushing force is balanced with the radially outward pushing force of the dynamic pressure generating grooves, and increases the internal oil pressure of the second minuscule gap g2 and the third taper gap g13. The oil having an increased internal pressure in each of the bearing portions B1, B2 exerts an oil dynamic pressure to raise the rotor hub 9, so that the rotor hub 9 is supported without contact.

Finally, an oil interface with the air is formed at a position where the axially upward pushing force of the bearing portion B1 is balanced with the axially downward pushing force of the oil in the second taper gap g12. According to this embodiment, the axially upward pushing force of the dynamic pressure generating grooves is so large that the oil interface with the air at the near end of the bearing portion B1 is designed to be located intermediate of the lower half of the dynamic pressure generating grooves and the the oil interface with the air of the second taper gap g12 somewhat radially more inward than when the motor is stationary. Specifically, the amount of oil in the second taper gap g12 is increased to the extent corresponding to the movement of the oil, which has existed at the near end of the bearing portion B1 while the motor is stationary, to the far end thereof. Also, the radially outward pushing force of the bearing portion B2 is balanced with the radially inward pushing force of the oil in the third taper gap g13 thereby to form an oil interface with the air. According to this embodiment, the radially outward pushing force of the dynamic pressure generating grooves is so large that the oil interface with the air at the near end of the bearing portion B2 is designed to be located intermediate of the inner half of the dynamic pressure generating grooves and the oil interface of the third taper gap g13 somewhat lower than when the motor is stationary. Specifically, the amount of oil in the third taper gap g13 is increased to the extent corresponding to the movement of the oil, which has existed at the near end of the bearing portion B2 while the motor is stationary, to the far end of the bearing portion B2.

In the process the internal oil pressure of the bearing portion B1, as shown in FIG. 4B, assumes a maximum value at the inflection point (designated by numeral a1) of the dynamic pressure generating grooves, which is progressively decreased from this inflection point toward the oil interfaces at the ends. Also, the internal oil pressure of the bearing portion B2 assumes a maximum value at the inflection point (designated by numeral a2) of the dynamic pressure generating grooves, and from this inflection point, gradually decreases toward the oil interfaces at the ends of the dynamic pressure generating grooves. Bubbles, if contained in the oil, tend to flow toward the point of lower internal oil pressure. With the formation of the internal oil pressure gradient described above, therefore, the bubbles flow toward the oil interfaces with the air and are discharged. In the process, the oil interfaces with the air at the near ends of the bearing portions B1, B2 of the dynamic bearing B are formed independently of each other in the vicinity of the bearing portions, and therefore the bubbles generated in the oil are easily discharged.

In the case where an oil interface with an air is formed at a point of the first taper gap g11, the bubbles generated in one of the bearing portions B1, B2 may be prevented from being discharged under the effect of the internal oil pressure of the other bearing portion. In the case where an oil interface with an air is formed independently at the near end of each of the bearing portions B1, B2, however, the bubbles can be smoothly discharged for lack of the interference of the internal oil between the bearing portions. Also during the time when the motor is stationary and no gradient of the internal oil pressure is formed, an oil interface with an air is formed at the portions connected to the ends of the bearing portions B1, B2, and therefore the bubbles contained in the oil are easily discharged outside. Specifically, regardless of whether the motor is stationary or in rotation, the dynamic bearing B is so configured as to discharge bubbles easily by forming an oil interface with an air at the portions thereof connected to the ends of the bearing portions. As compared with the conventional dynamic bearing having an oil interface with an air only at an end of the bearing portion, therefore, the malfunction due to bubbles is not likely to occur and therefore both the oil injection job and the assembly work are facilitated.

In the conical bearing portion B1 where the oil dynamic pressure is induced, as shown in FIG. 4B, the bearing power F1 is exerted in the direction perpendicular to the inner conical surface 9a forming the first minuscule gap g1. In the thrust bearing portion B2, on the other hand, the bearing power F2 works in the direction perpendicular to the inner lower end surface 9b of the rotor hub 9. Due to these two forces, the radial load of the rotary assembly 2 is supported by the radial component F1x of the bearing power F1, while the axial load of the rotary assembly 2 is supported by the equilibrium between the axial component F1y of the bearing power F1 and the bearing power F2 exerted in opposite directions.

In the dynamic bearing B, as shown in FIG. 5, the maximum point of the oil dynamic pressure induced in the conical bearing portion B1 is located outward (reference numeral a1) of the center of the bearing portion, and the maximum point of the oil dynamic pressure induced in the thrust bearing portion B2 is also located outward (reference numeral a2) of the center of the bearing portion. Therefore, a longer span s1 can be secured between the two maximum pressure points than in the case where these maximum pressure points are located at the centers of the bearing portions (reference numerals b1, b2) or inward (reference numerals c1, c2) of the centers of the bearing portions. Thus, the relation holds that s3<s2<s1, where s2 and s3 are spans in the case where the maximum pressure points are located as designated by reference numerals b1, b2 and c1, c2. The bearing power assumes a maximum value at the maximum pressure point of the bearing portion, and therefore the dynamic bearing B having a longer span between the two maximum pressure points, as compared with the dynamic bearings of the same size having the dynamic pressure generating grooves described above, can hold a stable posture of the rotary assembly 2, thereby achieving the characteristics hardly affected by external disturbances and high in shock resistance and vibration resistance.

In the case where a shock is applied to the rotary assembly 2 from outside or the motor position is changed so that the direction of gravity exerted on the rotary assembly 2 changes or otherwise external disturbances occur, the balance of the oil dynamic pressure is disrupted and the rotary assembly 2 begins to vibrate. Nevertheless, the internal pressure of the gaps narrowed under the effect of the disturbances rises while the internal oil pressure of the widened gaps drops. These changes of the internal pressure relax the effects of the disturbances, and the oil dynamic balance is restored with the result that the rotary assembly 2 rotates in stable fashion.

The dynamic bearing B supports the rotary assembly 2 without contact by striking the balance between the axial component F1y of the bearing power F1 of the conical bearing portion B1 and the bearing power F2 of the thrust bearing portion B2. Therefore, a bias structure, in which the magnetic center of the drive magnet 4 and the stator 6 is displaced in axial direction or a magnetic material is arranged in the vicinity of the lower end surface of the drive magnet 4, is not required for the rotary assembly other than the bearing portions B1, B2. For this reason, the motor M can be configured so that the magnetic centers of the drive magnet 4 and the stator 6 coincide with each other, and therefore an efficient magnetic interaction is secured for generating the running torque. A high efficiency of magnetic interaction suppresses the electromagnetic noises and vibrations considerably and a quiet motor is realized. Incidentally, according to this embodiment, the magnetic attraction occurs between the base plate 5 of a magnetic material and the drive magnet 4 and contributes to an improved stability of the rotary assembly 2. This magnetic attraction, however, acts as a complementary force for the rotary assembly 2. Even in the absence of this magnetic attraction, therefore, the desired bearing characteristics of the dynamic bearing B can be achieved.

The dynamic bearing B is such that the oil interface with the air of the first taper gap g11 is divided during the steady rotation of the motor M, and a gas intermediary is formed in the third minuscule gap g3, the first taper gap g11 between the bearings B1, B2 and a part of the bearing portions B1, B2. In the dynamic bearing B, therefore, the area to hold the oil in the minuscule gaps formed between the rotary assembly 2 and the fixed assembly 3 is smaller when the motor is in steady rotation than when it is stationary. For the very reason that the taper seal portion connected to the near ends of the bearing portions B1, B2 is configured only at one point, the oil is held continuously inside the bearings B1, B2. During the steady rotation, however, the oil is pushed into a predetermined portion and the gas intermediary is increased in the minuscule gap formed between the rotary assembly 2 and the fixed assembly 3, so that the rotational resistance of the rotary assembly 2 is reduced for a lower axial loss. Due to this reduced axial loss, the current value required for driving the motor is reduced for a smaller power consumption of the motor M. In addition, the gas intermediary partly includes the bearing portion having the dynamic pressure generating grooves, and therefore the axial loss is reduced more effectively.

Once the motor M in steady rotation comes to stop, the pushing force of the dynamic pressure generating grooves ceases to work. Therefore, the oil interfaces at the near ends of the bearing portions B1, B2 are moved toward the bearing center and combined into one interface again as shown in FIG. 4A. This movement of the oil interfaces not only reduces the axial loss but also contributes to the extension of life of the dynamic bearing B. Specifically, even in the case where the amount of oil held in one of the bearing portions B1, B2 is reduced extremely and if left as they are, the bearing characteristics are at the risk of deterioration during the rotation of the motor, the merger of the oils of the bearing portions B1, B2 makes it possible to supply the extraneous oil in one bearing portion to the other after stopping the motor. As a result, the oil depletion in any one of the bearing portions is suppressed and the reduction in the bearing characteristics of the bearing portion prevented. Thus, the life of the dynamic bearing B is lengthened.

The whole of the cone member 10 and the shaft 7 is fixedly fitted under pressure with substantially the same fitting force. As an alternative, a fixing structure is employed in which the fitting force for the lower half (i.e. the area corresponding to the radially inward portion of the conical bearing portion B1) of the cone member 10 is reduced while increasing the fitting force for the upper half thereof is increased. Then, when the cone member 10 and the rotor hub 9 are thermally expanded, the lower half of the cone member 10 is expanded substantially free of the restriction from the shaft 7. Specifically, in the case where the cone member 10 is fixedly fitted under pressure over the whole of the shaft 7, the cone member 10, if thermally expanded, is affected in its entirety by the shaft 7. Therefore, the outer conical surface 10a is expanded substantially only in radial direction, while the rotor hub 9 is expanded in both axial and radial directions. Thus, the shape of the first minuscule gap g1 is unbalanced. In the fixing structure under consideration, in contrast, the lower side of the cone member 10 is not affected by the shaft 7, and therefore the outer conical surface 10a is expanded in both axial and radial directions, so that the first minuscule gap g1 is similarly reduced in size without disrupting the gap shape. This similar reduction in gap shape by thermal expansion facilitates the dimensional management of the first minuscule gap g1. At high temperatures causing thermal expansion, the oil viscosity is reduced. Since the internal oil pressure is increased by an amount corresponding to the gap size reduction, however, the bearing characteristics are not substantially affected even by a low-viscosity oil.

Next, a method of assembling the motor M is explained.

First, the fixed assembly including the shaft 7, the stator 6 and a circuit board and the rotary assembly including the rotor hub 9 and the drive magnet 4 are assembled on a base plate 5. The shaft 7 of the fixed assembly is inserted into the conical through hole of the rotor hub 9 of the rotary assembly, and the inner lower end surface 9b of the rotor hub 9 and the upper end surface of the thrust portion 7a are brought into contact with each other. Then, the cone member 10 is forced under pressure midway into the shaft 7. Under this condition, the spaced distance (h) in axial direction between the outer conical surface 10a of the cone member 10 and the inner conical surface 9a of the rotor hub 9 is measured. Next, the cone member 10 is further moved to the extent that the spaced distance (h) comes to coincide with the spaced distance (h1) predetermined in design stage based on the rigidity and the axial loss required of the bearing. In the process, the distance covered by the cone member 10 is given as h–h1.

By this assembly process, the first and second minuscule gaps g1, g2 forming the bearing portions B1, B2 are determined based on the assembly accuracy. Therefore, the assembly process can be executed with high accuracy and low cost. This compares with the ordinary method in which to improve the assembly accuracy, complicated processes are required to be employed to improve the accuracy of individual parts or select the parts minimizing the tolerance after assemblage before the assembly process.

In moving the cone member 10 as described above, the outer conical surface 10a providing the bearing surface of the cone member 10 can be held by a predetermined holding means without damaging the outer conical surface 10a. Once the cone member 10 is completely assembled, the axial movement of the rotor hub 10 is restricted in collaboration with the thrust portion 7a, and therefore the assembly is not deformed and can be handled smoothly in the subsequent processes.

After that, a cover member 11 is fixedly bonded to the upper end surface of the rotor hub 9. This assembly is arranged in a vacuum environment, and a predetermined amount of oil is coated on any of the openings of the fourth minuscule gap g4, the third taper gap g13 and the communication hole 7c to restore the normal pressure. The resultant pressure difference pulls the oil into the minuscule gaps g1 to g4 and the taper gaps g11 to g13. With the rotation of the rotor hub 9, the oil is scraped in by the dynamic pressure generating grooves, so that the air mixed in the gaps is discharged into the atmosphere thereby to hold the oil as shown in FIG. 4A. Thus, the motor M is completed.

The disk D, when fixed on the motor M, is fitted on the rotor hub 9 and placed on the flange. While pressing the upper surface of the disk D, the annular clamp member D1 is forced fixedly under pressure on the rotor hub 9. As a result, the disk D is fixedly held between the flange and the clamp member D1.

When fitting the clamp member D1 into the rotor hub 9 under pressure, the rotor hub 9 is supported using the outer lower end surface 9c of the rotor hub 9 as a supporting surface. Specifically, with the outer lower end surface 9c of the rotor hub 9 located on the support, the clamp member D1 is fitted under pressure. In this way, the thrust bearing portion B2 is not subjected to an excessive load and the bearing surface can be protected from damage. When locating the outer lower end surface 9c on the support, the base plate 5 is removed to expose the outer lower end surface 9c thereof, or a through hole is formed at a predetermined portion of the base plate 5 opposed to the outer lower end surface 9c and the arm of the support is inserted into the through hole.

Figure 6:
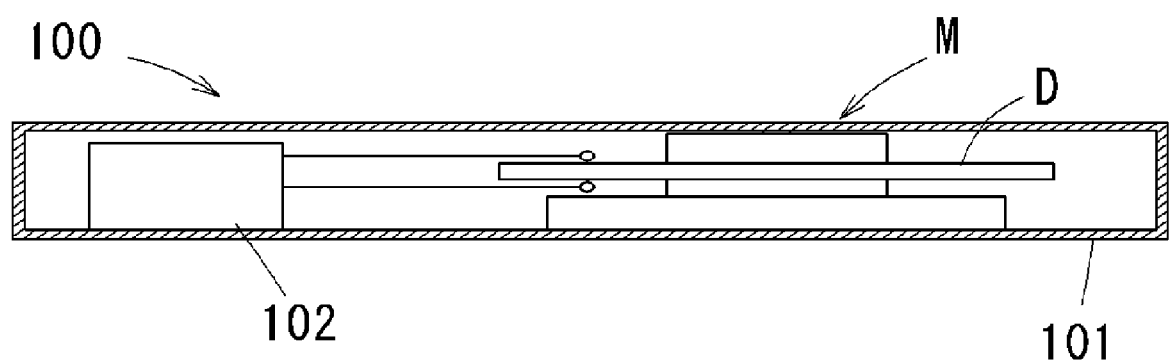
FIG. 6 is a sectional view showing a disk drive according to an embodiment of the invention.

Next, the HDD (hard disk drive) 100 according to this embodiment is explained with reference to the schematic diagram of FIG. 6. The interior of a housing 101 forms a clean space substantially free of dust, and the motor M carrying the disk D is arranged in this interior. In addition, a head moving mechanism 102 for reading/writing information on the disk D is arranged on the disk D. The head moving mechanism 102 is configured of a head 103 for reading/writing the information on the disk D, an arm 104 for supporting the head, and an actuator 105 for moving the head 103 and the arm 104 to a desired position on the disk D.

This HDD 100, which carries the motor M having the dynamic bearing B described above, is smaller in size, thickness and power consumption than the conventional HDD without adversely affecting the bearing characteristics, and thus exhibits a high shock resistance and a high vibration resistance. This HDD 100 preferably has the disk diameter of not more than one inch as a suitable application to a portable terminal or the like. Specifically, in view of the fact that the portable terminal is designed to be driven with an internal power supply, the power consumption of the motor is required to be small. Also, to secure portability, both the HDD and the motor are required to be compact and thin. Further, in the operating environment of the portable terminal, the HDD is easily subjected to an external shock and therefore requires a high shock resistance and a high vibration resistance. All of these requirements are met by the characteristics of the HDD 100 according to this embodiment.

The upper end of the shaft 7 of the motor M is fastened to the ceiling of the housing 101, and the fixed assembly 3 is interposed between the ceiling and the bottom. In this way, the axial fixing structure of the motor M is utilized to improve the rigidity of the housing 101.

The disk drive according to the invention is of such a type that like the HDD 100 described above, the disk is constantly fixed on the motor. Nevertheless, the invention is applicable also to the disk drive for storing the information in a removable discal storage medium such as HD, CD-ROM/R/RW, DVD, MO, MD, FD.

EMBODIMENT 2

With regard to the dynamic bearing, the motor and the disk drive according to a second embodiment, the difference thereof from the first embodiment is mainly explained, and the same or equivalent parts are designated by the same reference numerals, respectively, and not explained.

Figure 7:
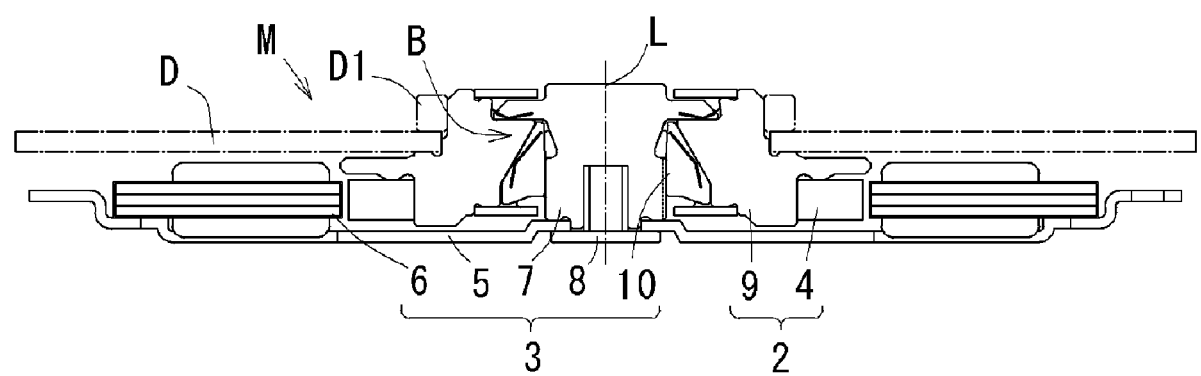
FIG. 7 is a sectional view showing an oil dynamic bearing and a motor according to a second embodiment of the invention.
Figure 8:
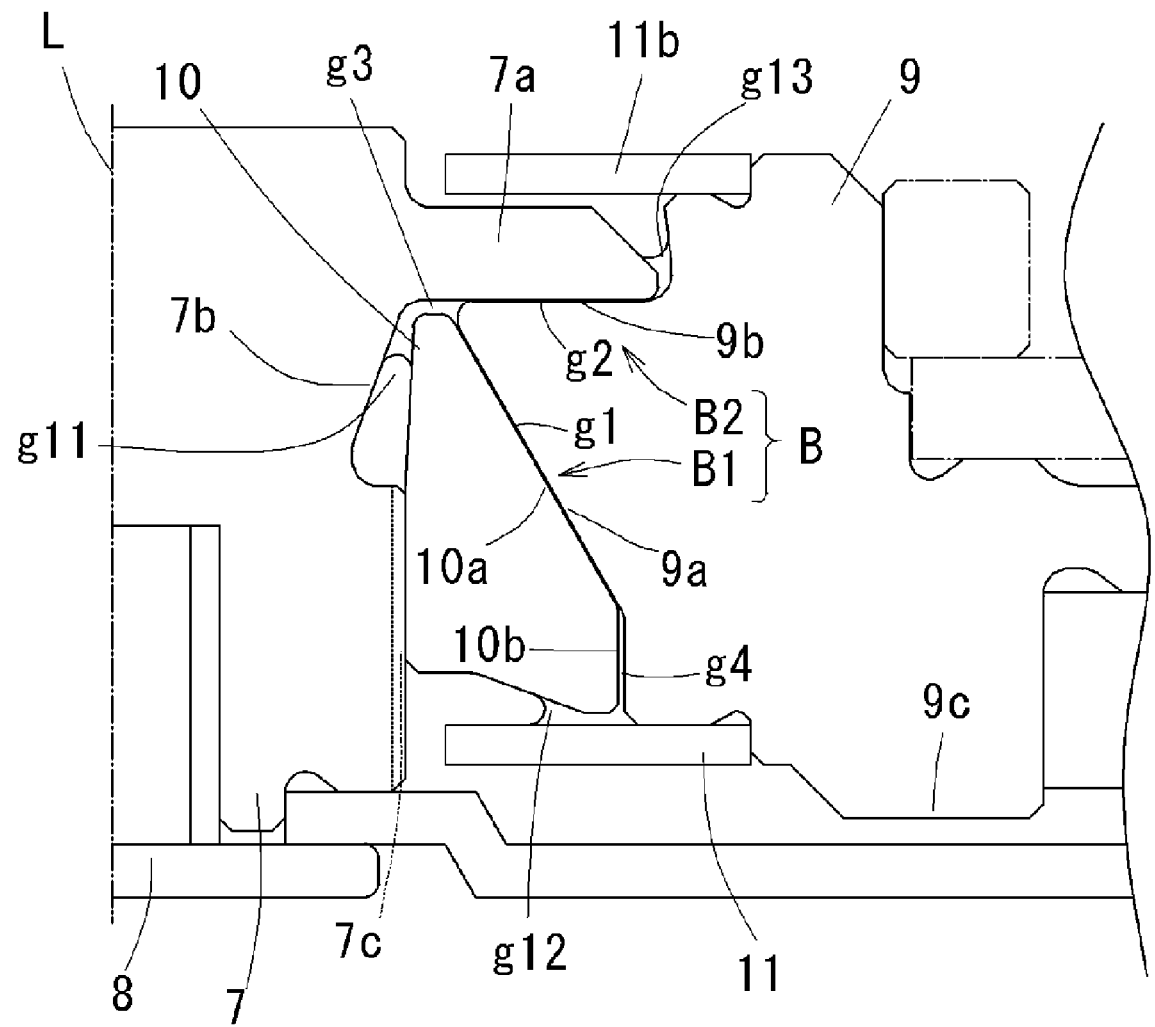
FIG. 8 is a sectional view showing the essential parts built around the oil dynamic bearing of FIG. 6.

The second embodiment is different from the first embodiment in that, as shown in FIGS. 7, 8, the conical bearing portion B1 and the thrust bearing portion B2 making up the dynamic bearing B are arranged in vertically opposite positions, the span of the thrust bearing portion B2 is reduced substantially to the same length as the radial component of the span of the conical bearing portion B1. In the case where the thrust bearing portion B2 remains located above the conical bearing portion B2 as in the first embodiment, the bearing power F2 would become excessive and the balance with the axial component F1y of the bearing power F1 would be disrupted. According to this embodiment, therefore, the balance is kept by reducing the span of the thrust bearing portion B2 as compared with the first embodiment. The third taper gap g13 open upward is covered by a second cover member 11b newly fixed on the rotor hub 9 to shut off foreign matter.

EMBODIMENT 3

The difference of the dynamic bearing, the motor and the disk drive according to a third embodiment from the first embodiment is mainly explained, and the same or equivalent parts are designated by the same reference numerals, respectively, and not explained.

Figure 9:
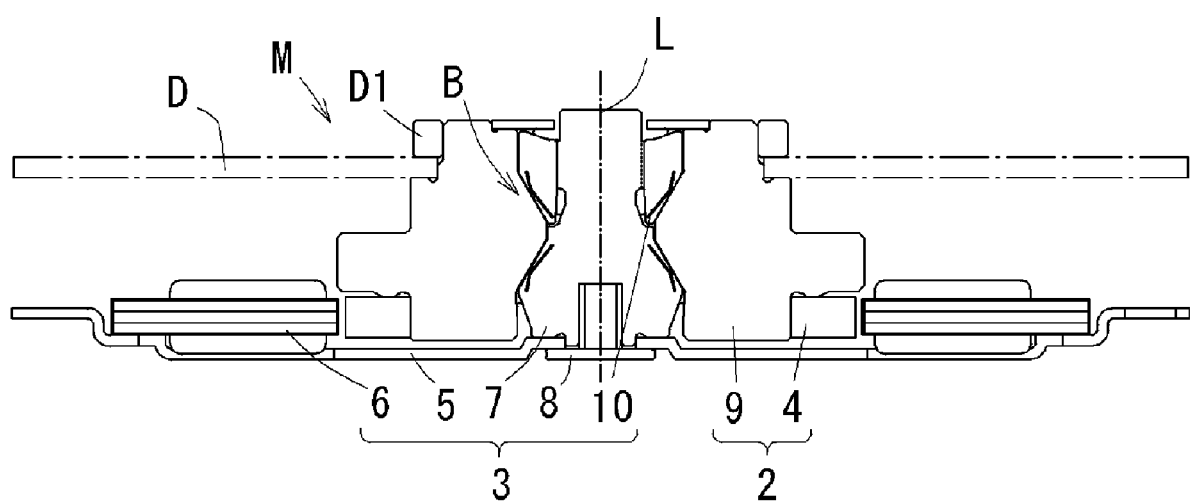
FIG. 9 is a sectional view showing an oil dynamic bearing and a motor according to a third embodiment of the invention.
Figure 10:
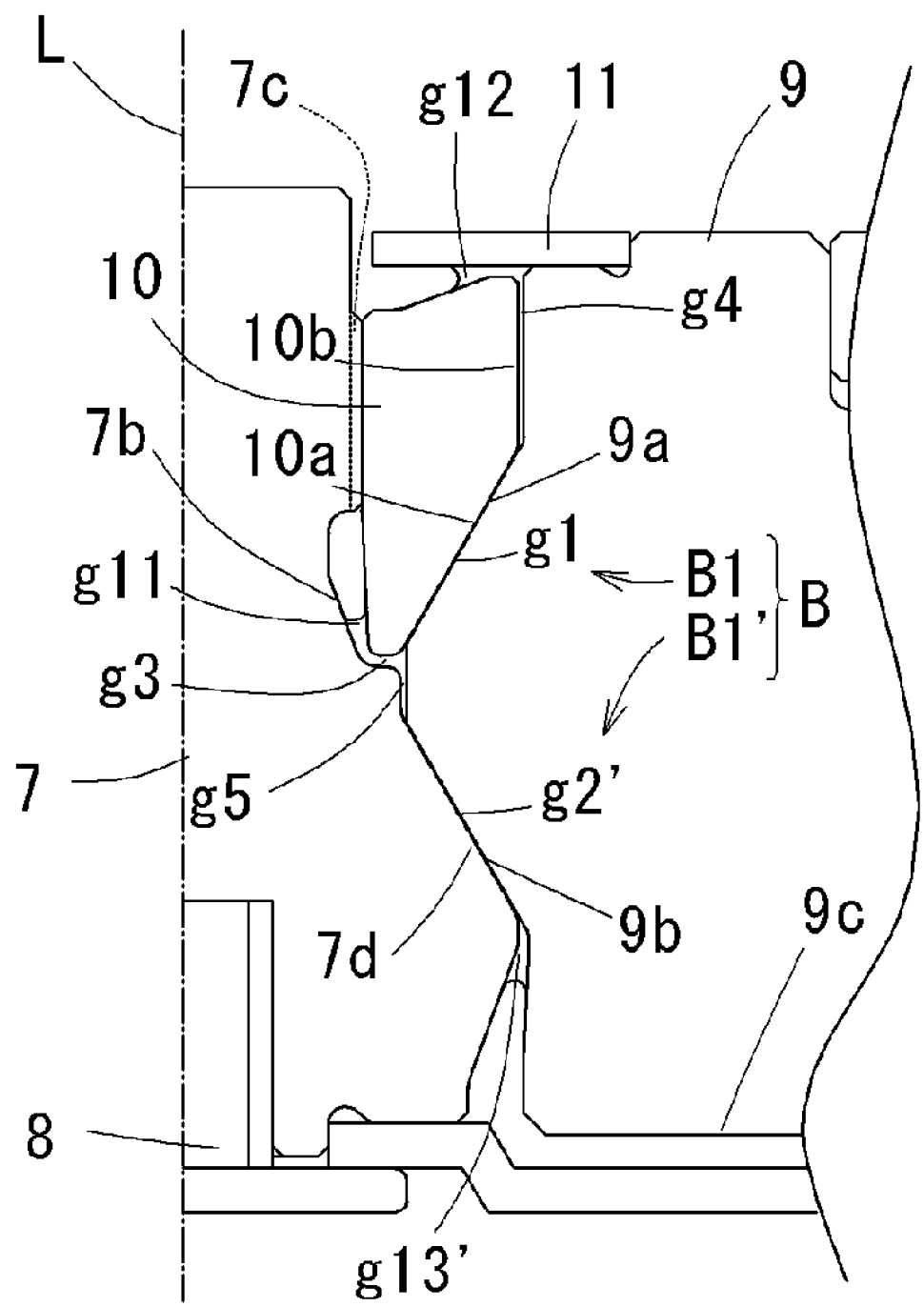
FIG. 10 is a sectional view showing the essential parts built around the oil dynamic bearing of FIG. 8.

This embodiment is different from the first embodiment in that as shown in FIGS. 9, 10, the dynamic bearing B is configured of two conical bearing portions B1, B1' in vertically positions. These bearing portions B1, B1' are also related to each other that the direction from the near end located nearer to the rotational axis or the bearing center of the bearing to the far end located farther from the rotational axis or the bearing center of the bearing is different between the bearing portions B1, B1'.

Specifically, the upper first conical bearing portion B1 is configured of a conical bearing surface reduced in diameter downward, while the lower second conical bearing portion B1' is configured of a conical bearing surface reduced in diameter upward. Thus, the axial components of the bearing power work in opposite directions. The second conical bearing portion B1' is configured of a second minuscule gap g2' defined by an outer conical surface 7d of the shaft 7 and an inner conical surface 9b of the rotor hub 9, and the whole periphery of the outer conical surface 7d is formed with dynamic pressure generating grooves of unbalanced herring bone type to push the oil axially downward. The lower end side of the second minuscule gap g2' makes up a taper seal portion in the third taper gap g13' and thereby forms an oil interface with the atmosphere. The minuscule gaps for communication between the first and second minuscule gaps g1, g2 include the third minuscule gap g3 extending radially and the fifth minuscule gap g5 extending axially. Also in the dynamic bearing B according to this embodiment, the oil is divided and forms the oil interface in each of the first and second minuscule gaps g1, g2' during the rotation. The cone member 10 may be integrated with the shaft 7 and the conical portion under the shaft 7 may be configured as an independent member. The first taper gap g11 may extend axially downward, or may be formed with a communication hole to communicate with the atmosphere on the rotor hub 9 side.

Also in the dynamic bearing B according to this embodiment, the rotary assembly 2 can be supported without contact by collaboration between the bearing portions B1, B2', and therefore the bias means operating along the axial direction is not specifically required. Also, in view of the fact that the movement of the rotor hub 9 in axial direction is restricted by the bearing portions B1, B2', the bearing portions B1, B2' function as a stopper of the rotary assembly 2. Further, since the radial bearing power is exerted at the axial ends, the rotary assembly 2 can be supported without contact in more stable manner. This embodiment is especially suitably applicable to the motor M of larger thickness.

Three embodiments of the invention are illustrated above. The scope of this invention is not limited to those embodiments, and the invention is variously modifiable without departing from the spirit and scope thereof.

Specifically, the oil dynamic bearing according to the invention, as shown in each embodiment, is configured of two bearing portions having different directions from the near end to the far end of the bearing. The invention is applicable, therefore, to a configuration in which the conical bearing portion B1 of the dynamic bearing B according to the first and second embodiments is replaced with a radial bearing portion defined by radially opposed minuscule gaps. This oil dynamic bearing including the thrust bearing portion and the radial bearing portion may further comprise a magnetic bias means for applying the energizing power corresponding to the bearing power F1y out of the bearing to strike the balance with the bearing power F2 of the thrust bearing portion B2. This magnetic bias means may be configured by displacing the magnetic center of the drive magnet 4 and the stator 6 or by arranging a magnetic material in the vicinity of the lower end surface of the drive magnet 4.

The conical bearing according to all embodiments may include a minuscule gap having a curved cross section instead of a linear cross section.

The first taper gap g11 according to each embodiment, though configured to open axially upward, may alternatively open axially downward or radially.

In the dynamic bearing B according to each embodiment, the oil at the near ends of the two bearing portions communicate with each other while the motor is stationary and are divided during the rotation to form an oil interface with an air in each bearing span. As long as there is no need of reducing the axial loss, however, the oil amount, the gap capacity of each gap, the pushing force of the dynamic pressure generating grooves or the like specifications may be changed, so that the oil interface at the near end of the bearing portions during the rotation is located more inward, or an oil interface with an air is formed in the third minuscule gap g3 or the first taper gap for oil communication.

In all the embodiments, the dynamic pressure generating grooves are formed on the fixed assembly. Nevertheless, they may be formed on the rotary assembly side. In any way, the dynamic pressure generating grooves may be spiral instead of unbalanced herring bone in shape.

In the dynamic bearing B according to each embodiment, the fourth minuscule gap g4 is interposed between the conical bearing B1 and the second taper gap g12. This fourth minuscule gap g4 may be done without, however, if the pushing force of the dynamic pressure generating grooves and the second taper gap g12 are balanced by changing the setting of the pushing force of the bearing portions due to the centrifugal force.

According to each embodiment, the dynamic bearing B may be formed of a porous sintered metal instead of normal metal.

In each embodiment, the motor M is of axially fixed type, and may alternatively be of axially rotation type by inverting the relative positions of the related parts.

In each embodiment, the motor M is of inner rotor type with the rotor magnet 4 arranged radially inward of the stator 6, and may alternatively be of outer rotor type or surface opposed type in axially opposed relation.

In each embodiment, the motor M has a structure lacking the bias means acting in axial direction other than the dynamic bearing B. To improve the stability of the rotary assembly further, however, the bias means may be added to use the bias at the same time.

As described above, modifications not departing from the spirit and scope of the invention are all included in the claims appended hereto.

What is claimed is:

1. An oil dynamic bearing having a bearing center comprising:
   a fixed unit;
   a rotary unit; and
   two bearing portions for rotatably supporting the rotary unit about a rotational axis, in which at least one of the opposed surfaces of the fixed unit and the rotary unit is formed with a plurality of dynamic pressure generating grooves, and an oil is held in the minuscule gap between the fixed unit and the rotary unit including a part or the whole of the dynamic pressure generating grooves;
   wherein the two bearing portions include:
   first and second taper seal portions, each of the taper seal portions having an outer pressure-side seal end portion communicating with an atmosphere and an inner pressure-side seal end portion connected separately and respectively to each of bearing far end portions of the two bearing portions, the bearing far end portion defined as one end of the bearing portion farther from selected one of the rotational axis and the bearing center of the oil dynamic bearing; and
   a third taper seal portion having an outer pressure-side seal end portion communicating with the atmosphere and an inner pressure-side seal end portion connected in common to each of bearing near end portions of the two bearing portions, the bearing near end portion defined as one end of the bearing portion nearer to selected one of the rotational axis and the bearing center of the oil dynamic bearing; and
   wherein the two bearing portions have different directions from the bearing near end to the bearing far end, and each taper seal portion has a gradually wider distance between the opposed surfaces of the fixed unit and the rotary unit at an observing point in proportion to the observing point moving from the inner pressure-side seal end portion to the outer pressure-side seal end portion.

2. An oil dynamic bearing according to claim 1, wherein the third taper seal portion is arranged in a virtual truncated cone space having an upper circle and a lower circle, the upper circle is formed by the bearing far end portion of the upper bearing portion and the lower circle is formed by the bearing far end portion of the lower bearing portion.

3. An oil dynamic bearing according to claim 1, wherein each oil interface with an air is formed in each of the taper seal portions connected to the bearing far ends of the two bearing portions.

4. An oil dynamic bearing according to claim 3, wherein the dynamic pressure generating grooves of the two bearing portions have the shape of an unbalanced herring bone to induce an oil dynamic pressure pushing the oil toward the bearing far end of each bearing portion.

5. An oil dynamic bearing according to claim 4, wherein a third oil interface with an air is formed in the third taper seal portion while the rotary unit is not rotating, and the third oil interface is divided into and formed at two divided oil interfaces at a vicinity of each of the bearing near ends of the bearing portions while the rotary unit is rotating.

6. An oil dynamic bearing according to claim 5, wherein at least selected one of the divided oil interfaces is formed in an area having the dynamic pressure generating grooves.

7. An oil dynamic bearing according to claim 6, wherein the third taper seal portion is arranged in a virtual truncated cone space having an upper circle and a lower circle, the upper circle is formed by the bearing far end portion of the upper bearing portion and the lower circle is formed by the bearing far end portion of the lower bearing portion.

8. An oil dynamic bearing according to claim 7, wherein the two bearing portions include a conical bearing generating a downward pressure and a thrust bearing having a bearing surface perpendicular to the rotational axis generating an upward pressure, while the rotary unit is rotating.

9. An oil dynamic bearing according to claim 8, wherein the fixed unit includes a stationary shaft extending along the rotational axis, a ring-like thrust portion arranged at right angle to the stationary shaft, and a cone portion fixedly fitted on the stationary shaft having a conical surface diagonally of the rotational axis;
   the rotary unit includes a rotor conical surface opposed to the conical surface of the cone portion through a minuscule gap, and a rotor flat surface opposed to one of the flat surfaces along the rotational axis of the thrust portion through a minuscule gap;
   the conical bearing is formed between the conical surface of the cone portion and the rotor conical surface of the rotary unit;

the thrust bearing is formed between one of the flat surfaces along the rotational axis of the thrust portion and the flat surface of the rotary unit; and the cone portion is adapted to be positioned and fixed with respect to the fixed unit while the opposed surfaces of the minuscule gaps forming the thrust bearing are in contact with each other.

10. An oil dynamic bearing according to claim 7, wherein the two bearing portions include upper and lower conical bearings, the upper conical bearing generates downward pressure and the lower bearing generates upward pressure, while the rotary unit is rotating.

11. An oil dynamic bearing according to claim 10, wherein the fixed unit includes a stationary shaft extending along the rotational axis, a upper cone surface diagonally of the rotational axis, and a lower cone portion diagonally of the rotational axis in opposed relation to the upper cone surface;

the rotary unit includes a upper rotor conical surface opposed to the conical surface of the upper cone portion through a minuscule gap and a lower rotor conical surface opposed to the lower conical surface of the lower cone portion through a minuscule gap;

a upper conical bearing is formed between the upper conical surface of the upper cone portion and the upper rotor conical surface of the rotary unit, and a second conical bearing is formed between the upper conical surface of the upper cone portion and the upper rotor conical surface of the rotary unit; and wherein the second cone portion is adapted to be positioned and fixed with respect to the fixed unit while the opposed surfaces of the minuscule gap forming the conical bearing are in contact with each other.

12. An oil dynamic bearing according to claim 7, wherein the two bearing portions include a radial bearing generating radial pressure in radial direction and a thrust bearing generating axial pressure in rotational axis direction, and the oil dynamic bearing further comprises a bias means for generating attractive force on the rotary unit in rotational axis direction.

13. A motor comprising:

an oil dynamic bearing according to claim 12;

a magnet arranged and fixed to the rotary unit; and a stator arranged in opposed relation to the magnet.

14. A motor according to claim 13, wherein the fixed unit includes a cylindrical shaft located on the rotational axis, and an upper and a lower ends of the shaft are exposed out of the motor.

15. A motor according to claim 14, which is a spindle motor for rotationally driving a disk having information stored therein and having the diameter of not more than one inch.

16. A disk drive having mounted thereon a discal recording medium capable of recording information, comprising:

a housing;

a spindle motor fixed in the housing for rotating the recording medium; and an information access means for writing/reading the information at the desired position of the recording medium;

wherein the spindle motor is as described in claim 15.

17. A disk drive having mounted thereon a discal recording medium capable of recording information, comprising:

a housing;

a spindle motor fixed in the housing for rotating the recording medium; and an information access means for writing/reading the information at the desired position of the recording medium;

wherein the spindle motor is as described in claim 13.

18. A motor comprising:

an oil dynamic bearing having a bearing center;

a fixed unit;

a rotary unit;

a magnet arranged integrally with the rotary unit; and a stator arranged integrally with the fixed unit in opposed relation to the magnet;

wherein the oil dynamic bearing includes:

two bearing portions for rotatably supporting the rotary unit about a rotational axis, in which at least one of the opposed surfaces of the fixed unit and the rotary unit is formed with a plurality of dynamic pressure generating grooves, and an oil is held in the minuscule gap between the fixed unit and the rotary unit including a part or the whole of the dynamic pressure generating grooves;

wherein the two bearing portions include:

first and second taper seal portions, each of the taper seal portions having an outer pressure-side seal end portion communicating with an atmosphere and an inner pressure-side seal end portion connected respectively to an each bearing far end of the two bearing portions, the bearing far end portion defined at a far end farther from selected one of the rotational axis and the bearing center of the oil dynamic bearing; and a third taper seal portion having an outer pressure-side seal end portion communicating with the atmosphere and an inner pressure-side seal end portion connected in common to an each bearing near end of the two bearing portions, the bearing near end locating nearer to selected one of the rotational axis and the bearing center of the oil dynamic bearing; and wherein the two bearing portions have different directions from the bearing near end to the bearing far end and each taper seal portion has a gradually wider distance between the opposed surfaces of the fixed unit and the rotary unit at a observing point in proportion to the observing point moving from the inner pressure-side seal end portion to the outer pressure-side seal end portion; and wherein the third taper seal portion is arranged in a virtual truncated cone space having an upper circle and a lower circle, the upper circle is formed by the bearing far end portion of the upper bearing portion and the lower circle is formed by the bearing far end portion of the lower bearing portion; and wherein each oil interface with an air is formed in each of the taper seal portions connected to the bearing far ends of the two bearing portions; and wherein the dynamic pressure generating grooves of the two bearing portions have the shape of an unbalanced herring bone to induce an oil dynamic pressure pushing the oil toward the bearing far end of each bearing portion; and wherein a third oil interface with an air is formed in the third taper seal portion while the rotary unit is not rotating, and the third oil interface is divided into and formed at two divided oil interfaces at a vicinity of each of the bearing near ends of the bearing portions while the rotary unit is rotating; and wherein at least selected one of the divided oil interfaces is formed in an area having the dynamic pressure generating grooves.

19. A motor according to claim 18:

wherein the two bearing portions include a conical bearing generating a downward pressure and a thrust bearing having a bearing surface perpendicular to the rotational axis generating an upward pressure, while the rotary unit is rotating; and wherein the fixed unit includes a stationary shaft extending along the rotational axis, a ring-like thrust portion arranged at right angle to the stationary shaft, and a cone portion fixedly fitted on the stationary shaft having a conical surface diagonally of the rotational axis;

the rotary unit includes a rotor conical surface opposed to the conical surface of the cone portion through a minuscule gap, and a rotor flat surface opposed to one of the flat surfaces along the rotational axis of the thrust portion through a minuscule gap;

the conical bearing is formed between the conical surface of the cone portion and the rotor conical surface of the rotary unit;

the thrust bearing is formed between one of the flat surfaces along the rotational axis of the thrust portion and the flat surface of the rotary unit; and the cone portion is adapted to be positioned and fixed with respect to the fixed unit while the opposed surfaces of the minuscule gaps forming the thrust bearing are in contact with each other.

20. A motor according to claim 18, wherein the two bearing portions include upper and lower conical bearings, the upper conical bearing generates downward pressure and the lower bearing generates upward pressure, while the rotary unit is rotating; and wherein the fixed unit includes a stationary shaft extending along the rotational axis, a upper cone surface diagonally of the rotational axis, and a lower cone portion diagonally of the rotational axis in opposed relation to the upper cone surface;

the rotary unit includes a upper rotor conical surface opposed to the conical surface of the upper cone portion through a minuscule gap and a lower rotor conical surface opposed to the lower conical surface of the lower cone portion through a minuscule gap;

a upper conical bearing is formed between the upper conical surface of the upper cone portion and the upper rotor conical surface of the rotary unit, and a second conical bearing is formed between the upper conical surface of the upper cone portion and the upper rotor conical surface of the rotary unit; and the rotary unit; and wherein the second cone portion is adapted to be positioned and fixed with respect to the fixed unit while the opposed surfaces of the minuscule gap forming the conical bearing are in contact with each other.

* * * * *